(12) United States Patent
Chabot et al.

(10) Patent No.: US 9,833,730 B2
(45) Date of Patent: Dec. 5, 2017

(54) SELF-CLEANING SYSTEM FOR FILTER PRESS

(71) Applicant: LES ÉQUIPEMENTS D'ÉRABLIÈRES CDL INC., St-Lazare-de-Bellechasse (CA)

(72) Inventors: Marc-André Chabot, St-Damien de Buckland (CA); Stéphane Doyon, St-George de Beauce (CA)

(73) Assignee: LES ÉQUIPEMENTS D'ÉRABLIÈRE CDL INC., St-Lazare-de-Bellechasse (CA)

( * ) Notice: Subject to any disclaimer, the term of this patent is extended or adjusted under 35 U.S.C. 154(b) by 231 days.

(21) Appl. No.: 14/713,641

(22) Filed: May 15, 2015

(65) Prior Publication Data

US 2015/0328570 A1 Nov. 19, 2015

Related U.S. Application Data

(60) Provisional application No. 61/994,352, filed on May 16, 2014.

(51) Int. Cl.
| | | |
|---|---|---|
| *B01D 25/164* | (2006.01) | |
| *B01D 25/21* | (2006.01) | |
| *B01D 25/32* | (2006.01) | |

(52) U.S. Cl.
CPC ......... *B01D 25/164* (2013.01); *B01D 25/215* (2013.01); *B01D 25/32* (2013.01); *B01D 25/322* (2013.01); *B01D 2201/265* (2013.01)

(58) Field of Classification Search
CPC .. B01D 25/164; B01D 25/1645; B01D 25/32; B01D 25/322; B01D 25/325; B01D 25/327; B01D 25/215
See application file for complete search history.

(56) References Cited

U.S. PATENT DOCUMENTS

| | | | | | |
|---|---|---|---|---|---|
| 1,302,813 | A | * | 5/1919 | Kuryla | B01D 25/164 210/189 |
| 3,347,383 | A | * | 10/1967 | Augerot | B01D 25/19 100/198 |
| 5,328,617 | A | * | 7/1994 | De Haan | B01D 25/003 100/198 |
| 2005/0199559 | A1 | * | 9/2005 | Duby | B01D 25/164 210/770 |
| 2006/0102564 | A1 | * | 5/2006 | Huang | B01D 25/164 210/769 |

* cited by examiner

*Primary Examiner* — Robert Clemente
(74) *Attorney, Agent, or Firm* — Gonzalo Lavin

(57) ABSTRACT

A self-cleaning system for a plate press (100) or cylinder press (110) for filtering a fluid product and for eliminating waste material accumulated on filter membranes (13) in a waste accumulation area (102) of the plate press (100) or cylinder press (110), said system comprising a drain port (DP) adjacent to the waste accumulation area (102), said system comprising an area (103) creating a circulation of water and/or forced air jets within the waste accumulation area (102) to expel the waste to the drain port (DP), whereby the waste accumulation area (102) is cleaned from the waste material without having to disassemble the plate press or cylinder press.

8 Claims, 10 Drawing Sheets

SELF-CLEANING SYSTEM FOR FILTER PRESS

REFERENCES TO A RELATED APPLICATION

This application claims priority to U.S. Provisional Patent Application Ser. No. 61/994,352 filed on May 16, 2014, the entire content of which is incorporated herein by reference.

FIELD OF THE INVENTION

The present invention relates to a self-cleaning system obtained by modifying standard circular or plate presses.

BACKGROUND OF THE INVENTION

The maple industry has produced maple syrup in the traditional way for about a hundred years until about the decade 1960 to 1970. Thereafter, it has undergone a transformation towards industrialization in order to cut production costs that became prohibitive. In the 60s, collecting maple sap was still done through buckets hanging from maple trees. Then in the 70s, sap collection was done through a network of tubing and gravity flow, then through vacuum systems. All to increase yields for collecting maple sap.

The syrup which is made by boiling the sap in the spring, contains suspended solids that appear during evaporation and cooking maple sap, which reduces the volume of water from 30% to 50% to give a syrup 66% sugar (Brix) and 34% water.

During collection, the average percentage of sugar in the sap varies from 1% to 5% depending on the type and age of trees. One must therefore remove a large volume of water to obtain a 66% concentrate of sugar syrup (Brix). The boiling volume can be reduced by using a method of nano filtration membrane commonly known as reverse osmosis.

Up to 90% of water molecules (H20) are removed, while retaining in the concentrate all the mineral/particles and the specific sap molecules. During the evaporation process certain particles from wood fiber (the tree) will appear as residues giving an acrid taste and blurred maple syrup product. So to improve quality, one must get rid of these suspended solids to obtain crystal clear syrup by filtration through a filter of 5-100 micro according to degree of clarity that is desired.

These materials, known as in the popular jargon as "sugar sand", which must be removed when the syrup comes out of the evaporator at 219 F or 104 C.

In the 1900s this filtration was done through a felt fabric installed above a circular container by gravity filtration. In time, this was replaced until today by cylindrical or plate presses, wherein filter papers or various membranes are inserted and which are supported by grooved plates in order to withstand the pressure of hot syrup (about 60 psi). FIG. 1 illustrates an example of a standard press. Under this pressure the fine particles present in the hot syrup rapidly clog the filter papers or filter membranes.

One way to solve this problem is to add an agglomerating powder which is used to capture suspended solids in the syrup. This powder is extremely fine diatomaceous earth consists of marine products (degradation product of crustaceans). It must be added constantly to increase the volume of syrup filtered prior to disassembly of the press, during a period of 30 minutes to 3 hours before disassembly, which varies from the start to the end of the sugaring season. There is no other solution than to disassemble the press and change the filter membranes several times during a day of production.

SUMMARY OF THE INVENTION

A preferred object of the present invention is to provide a self-cleaning system obtained by modifying standard filter presses in order to avoid frequent disassembly thereof requiring replacing filter membranes and to extend significantly the operating time of the device without disassembly up to several days.

According to the present invention, there is provided a self-cleaning system for a plate press or cylinder press for filtering a fluid product and for eliminating waste material accumulated on filter membranes in a waste accumulation area of the plate press or cylinder press, said system comprising a drain port adjacent to the waste accumulation area, said system comprising an area creating a circulation of water and/or forced air jets within the waste accumulation area to expel the waste to the drain port, whereby the waste accumulation area is cleaned from the waste material without having to disassemble the plate press or cylinder press.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

Figure 1A:
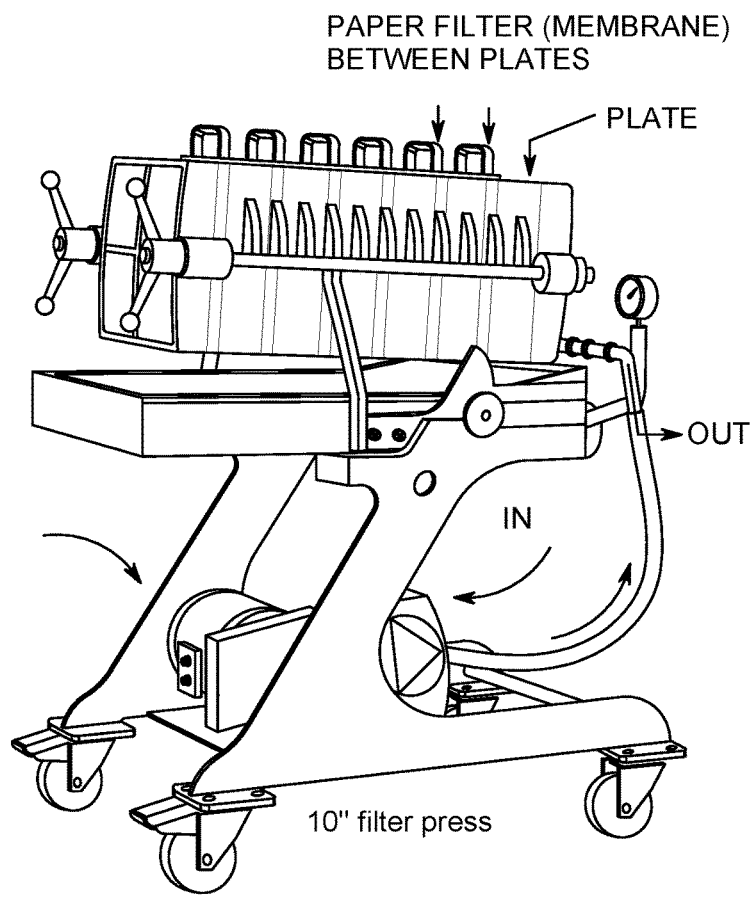
FIG. 1A is a perspective view of a standard press for filtering maple syrup.
Figure 1B:
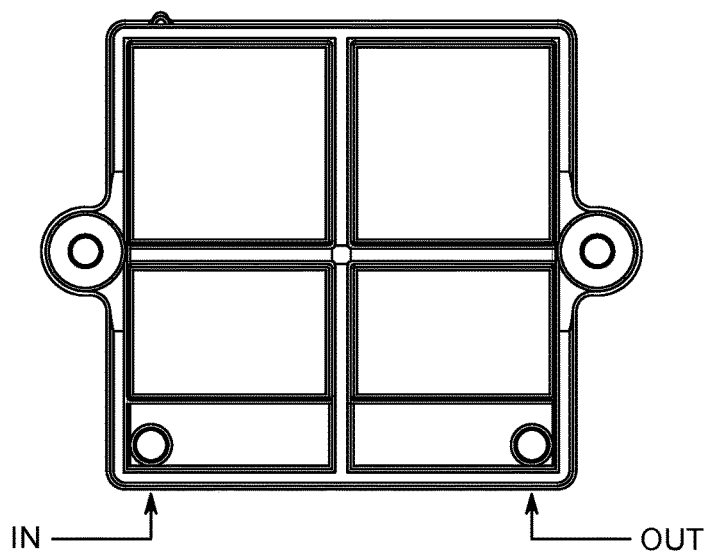
FIG. 1B is front view of a press plate of the standard press shown in FIG. 1A.

Referring to FIG. 1A, there is shown a standard filter press. It includes a motor with a pump with an inlet and an outlet for pumping syrup. The press includes a plurality of removable plate assemblies composed of filter plates between which is placed a filter paper or a membrane. As shown in FIG. 1B, each filter plate contains an entry (IN) for receiving the syrup coming from the pump and an outlet (OUT) from which comes out filtered syrup.

Referring back to FIG. 1, the standard filter press has an inlet for syrup and an outlet for returning the filtered syrup. As explained above, the filter plates and membrane filters must be frequently dismantled for cleaning of the press. Each plate assembly also includes a zone of accumulation of waste material and filter powder that must be removed for cleaning.

Figure 2:
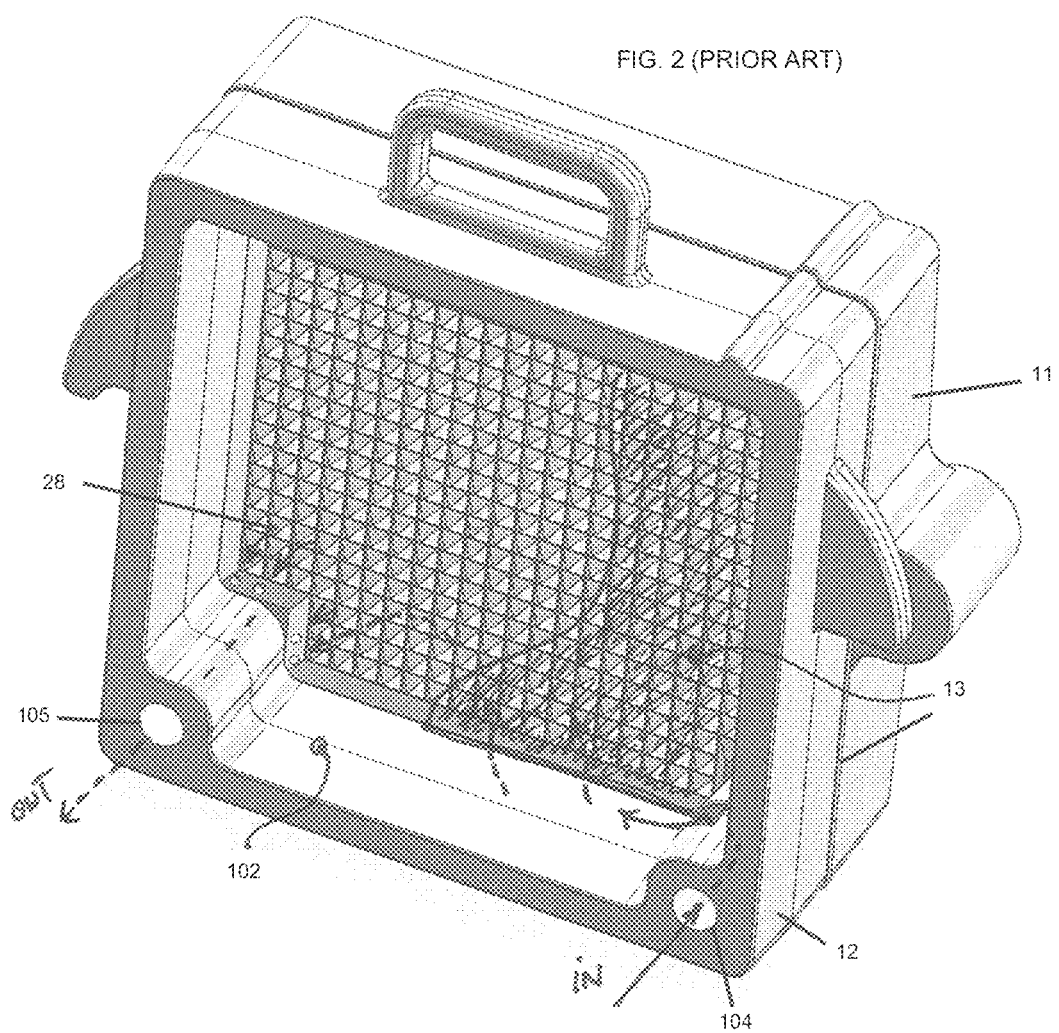
FIG. 2 is a perspective view of a standard press plate shown in FIG. 1A.

Referring to FIG. 2, there is shown a standard plate assembly of the press of FIG. 1A. The standard plate assembly is composed of a solid filter plate 11, a hollow filter frame 12 and a filter layer 13. The hollow filter plate 12 defines an inner area A thereof where waste material accumulates during filtration of the fluid product. The hollow filter frame 12 includes an inlet feed port 104 for receiving the fluid product and an outlet exit port 105 for expelling the filtrate. The solid plate 11 includes an inlet feed port (not shown) and an outlet exit port (not shown) for respective alignment with the inlet feed port 105 and the outlet exit port 105 of the hollow filter frame 12. The solid plate 11 includes at least one filtrate exit port 28 in an inner area thereof connected to the outlet exit port (not shown) for draining the filtrate. The filter layer 13 is configured to be installed between the hollow filter frame 12 and the solid plate 11 for filtering the fluid product. The filter layer 13 may be a filter paper or membrane.

Figure 3:
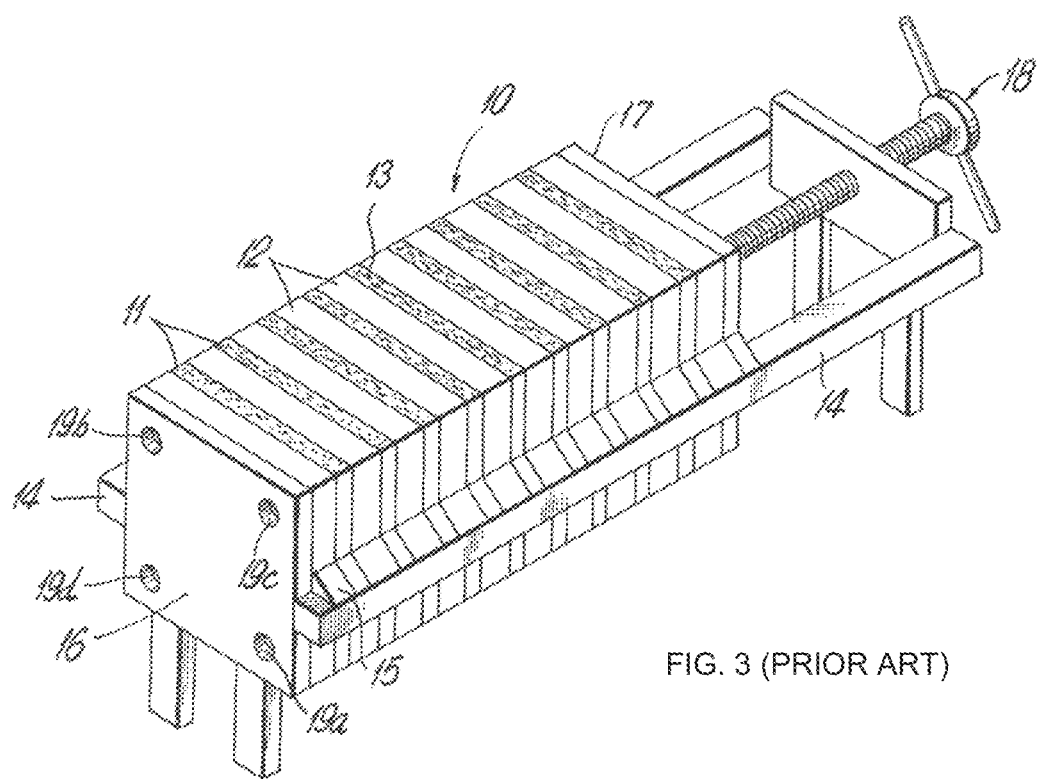
FIG. 3 is a perspective view of another typical plate and frame filter press that is similar to the standard press shown in FIG. 1A.

Referring to FIG. 3, there is shown a conventional industrial plate and frame filter press of another variant of a known standard press plate. The plate and frame filter press 10 is an assembly of alternate solid plates 11, the faces (not visible in this figure) of which are waffled to allow drainage of the filtrate and the hollow filter frames 12 in which the filter cake accumulates during filtration. A filter means 13, usually a layer of filter paper over a cloth fabric, covers both faces of each filter plate 11. The filter plates 11 and filter frames 12 are hung in a vertical position on a pair of parallel support rails 14 by means of support lugs 15. During the filtration process, the plates 11 and frames 12 are pressed to a substantially liquid-type closure between two half end plates, one fixed half end plate 16 and one movable half end plate 17, by a capstan screw or some other closing device 18. Openings 19a, 19b, 19c and 19d in the corners of the fixed end plate 16 provide access to the passageways or pipes when the plates 11 and frames 12 are stacked together since the plates 11 and frames 12 are generally provided with similar holes. One of the openings 19a is used to introduce the unfiltered feed to the filter frames 12 where the solids in the feed are accumulated. Two of the openings 19b and 19c are normally used to remove the filtrate from the press 10. The last opening 19d is normally used to flow water or solvent along the passageway backwash the filter cake at the end of a filter run by means of wash ports in the plates. Backwashing provides for removal of many of the solubles in the filter cake while it is still in the filter press chambers. This backwash process is accomplished by passing water or an appropriate solvent through the cake by means of ports in the plates to dissolve the solubles in the cake and wash out filtrate remaining in the cake. The wash liquor produced by the backwash process is removed via opening 19b with opening 19c valved off.

Figure 4:
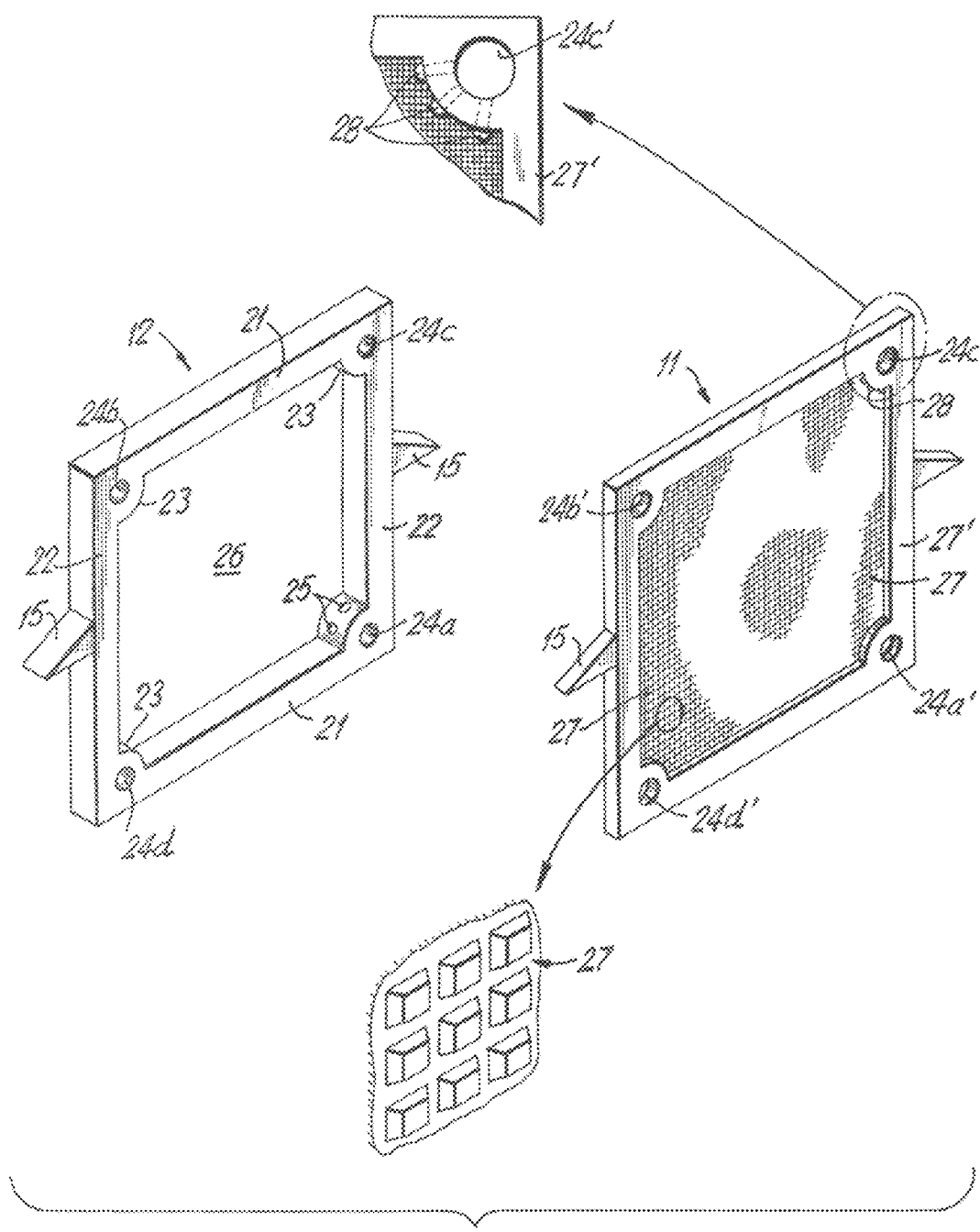
FIG. 4 shows the details of a conventional filter plate and filter frame of the press shown in FIG. 3.

Referring now to FIG. 4, a typical standard filter frame 12 is shown. The rectangular frame 12 consists of two horizontal sections 21 and two vertical sections 22 joined at their ends. At each of the inside corners arched members 23 extend from the horizontal and vertical sections to provide holes 24a, 24b, 24c and 24d. Hole 24a is aligned with the feed opening 19a thereby creating part of the feed passageway or pipe. Similarly holes 24b, 24c and 24d are aligned with half end plate openings 19b, 19c and 19d respectively. At the inside corner arch forming the hole 24a feed ports 25 connecting the open area of the frame 12 to passageway provided by hole 24a whereby the unfiltered feed enters the filtration chamber 26 and it is in this filtration chamber 26 that the filter aid accumulates. There is a support lug 15 on either side of the frame 12 enabling each frame to be properly aligned with the other alternating plates 11 and frames 12 of the press 10.

Referring again to FIG. 4, a representation of a standard filter plate 11 is shown. The filter plate 11 consists of a solid metal plate 27 with a raised area 27' around its edges to provide a gasketing surface when placed against filter frame sections 21 and 22. The raised region 27' encloses a continuous imperforate plate 27 both surfaces of which are waffled to provide support for the filter cloth-paper layers while allowing drainage of the filtrate from the plate area 27 to the filtrate exit passageway by means of filtrate exit ports. On the raised area 27', at the corners of the plate 11, there are holes 24a', 24b', 24c' and 24d' which match and are concentric with the corresponding holes 24a, 24b, 24c and 24d on the filter frame. One of the corners of the plate has the filtrate exit ports 28 which run underneath the raised area 27' between the front and rear waffled plate centers 27 and the corner hole 24c'. This allows the filtrate to leave an individual plate 11 and flow out of the filter press 10. The filter plate 11 also has support lugs 15 on either side. Both the front and the rear of the plate have the same details and configuration.

Even though the conventional industrial plate and frame filter press 10 may be cleaned via backwash as described above, this may only be suitable for certain kinds of fluid products or slurry. However, performing a backwash when using maple syrup or similar fluid product becomes very problematic. Indeed, the nature of maple syrup makes it almost impossible to properly clean the filter press by backwash alone. This is made worse if one adds an agglomerating powder to capture suspended solids in the syrup.

Figure 5:
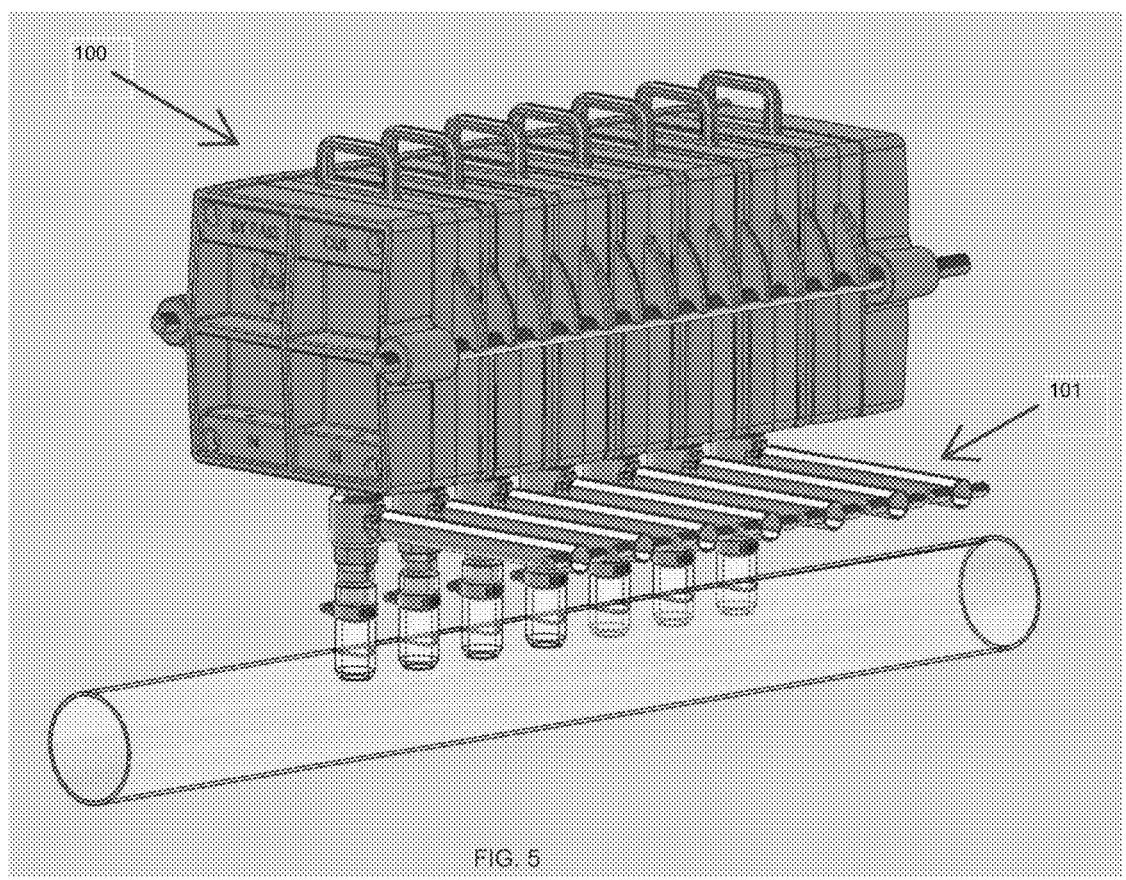
FIG. 5 is a perspective view of a self-cleaning press containing several removable plates and a draining system, according to a preferred embodiment of the present invention.
Figure 6:
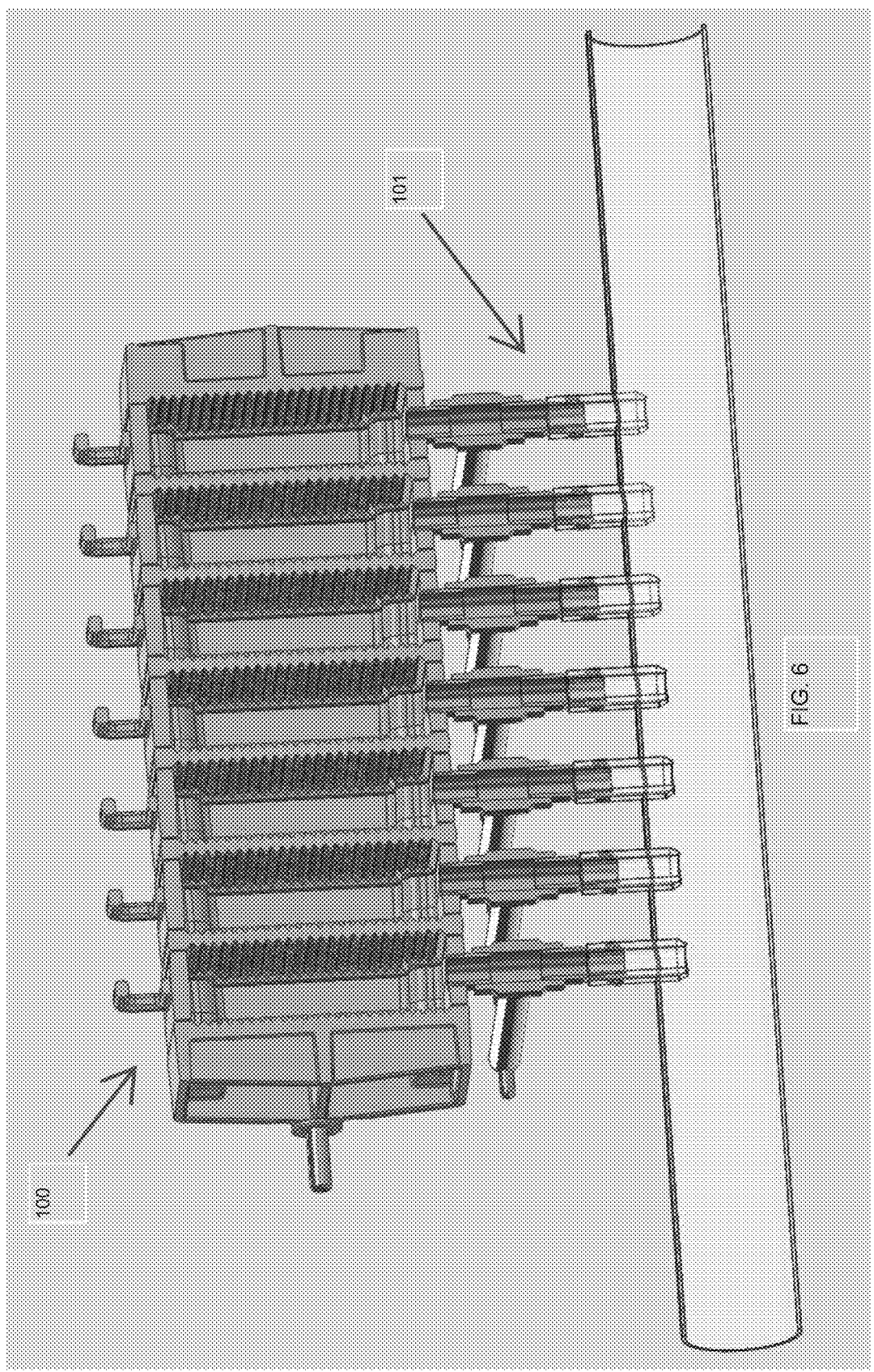
FIG. 6 is a section view of the self-cleaning press shown in FIG. 5.

Referring to FIGS. 5 and 6, there is shown a self-cleaning press 100 and its drain arrangement 101, according to a preferred embodiment of the present invention. The press 100 includes a plurality of removable plates each having a handle.

Figure 7:
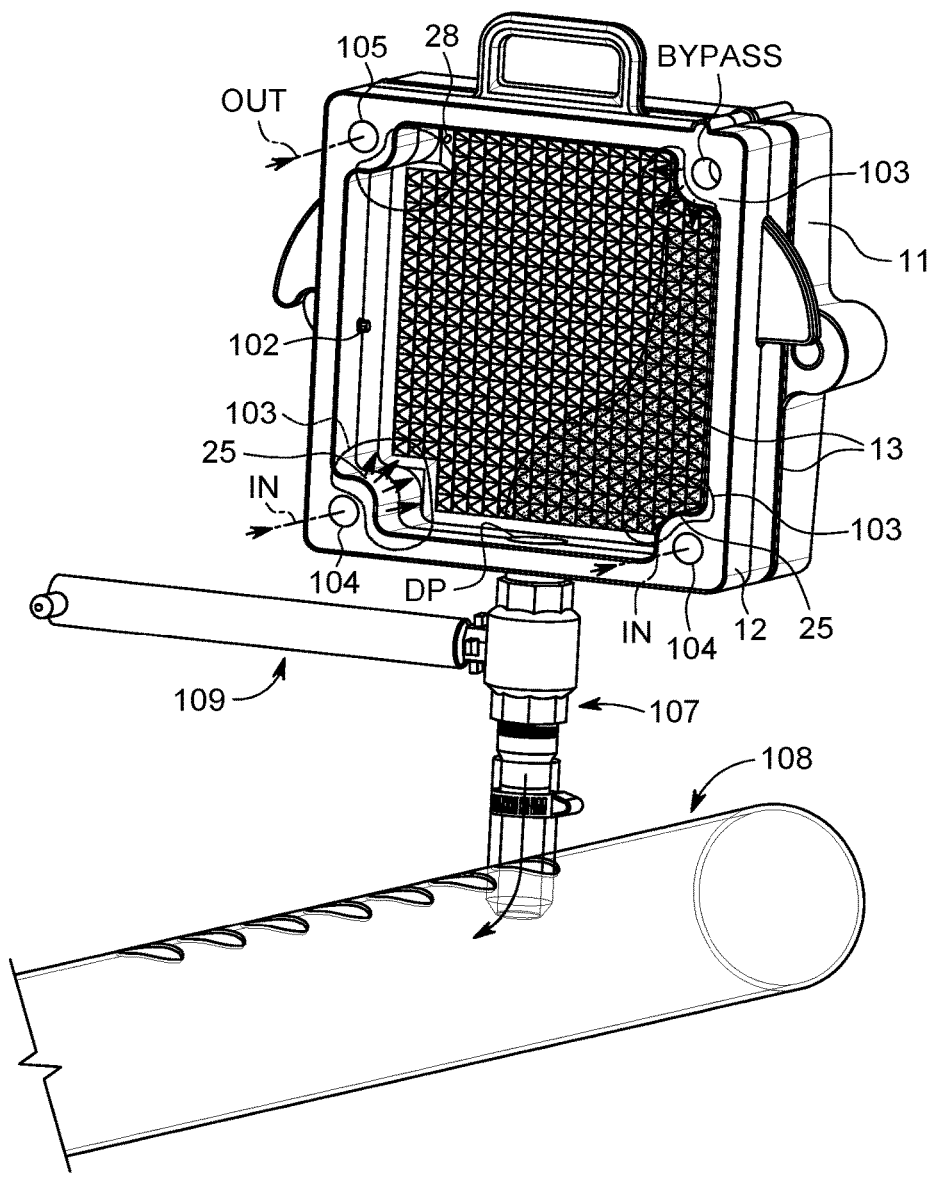
FIG. 7 is a schematic section view of a plate filter assembly and drain, according to a preferred embodiment of the present invention.

Referring to FIG. 7, there is shown a plate assembly of the self-cleaning press shown in FIG. 5, according to a preferred embodiment of the present invention. The plate assembly includes a hollow filter frame 12 defining an inner area 102 thereof where waste material accumulates during filtration of the fluid product. The hollow filter frame 12 includes an inlet feed port 104 for receiving the fluid product, such as maple syrup, and an outlet exit port 105 for expelling a filtrate, such as filtered maple syrup. The plate assembly also includes a solid filter plate 11, which may be similar to the standard solid plate shown in FIG. 4. The solid plate includes an inlet feed port 24a' (shown in FIG. 4) and an outlet exit port 24b' (shown in FIG. 4) for respective alignment with the inlet feed port 104 and the outlet exit port 105 of the hollow filter frame 12. The solid filter plate 11 includes a plurality of filtrate exit ports 28 in an inner area thereof connected to the outlet exit port 24b' for draining the filtrate. A filter layer 13 for filtering the fluid product is installed between the hollow filter frame 12 and the solid plate 11.

The hollow filter frame 12 includes a plurality of jet ports 25 in an inner zone 103 thereof connected to the inlet feed port 104 for injecting a pressurized cleaning fluid onto the inner area 102 of the hollow frame 12 and for dislodging the waste material. The pressurized cleaning fluid may be pressurized water and/or air.

The said hollow filter frame 12 further includes a drain port DP on the inner surface A thereof for draining the waste material being dislodged by the pressurized cleaning fluid being injected through the plurality of jet ports 25.

As illustrated, the hollow filter frame 12 may have two inlet feed ports 104, an outlet exit port 105 and a bypass. The area for accumulating residues or waste material 102 is in front of the filter membrane 13. The plurality of jet ports 25 are located at the corners of the hollow filter frame 12, near the inlet feed ports 104 on the internal side of the filter frame plate 12. These jet ports 25 define an interior area 103 where air and/or water comes out for washing the plate assembly.

The system functions as a self-cleaning water and air circulation, as jets emerge from the jet ports 25 of the area 103 between the plates of the press to remove impurities from the syrup diatomaceous earth and which are mixed together and form a thick and sticky paste in between the hollow filter frames 12 and membranes 13 which receive the hot syrup on the entrance side of the filter membrane 13. The mixture can thus be very quickly discharged by the self-cleaning and drainage system using the jet ports 25 in area 103, the drainage device 101 containing a drain 107 and an outlet 108, and without dismantling the press 100. A lever 109 allows to open and close the drain 107. This configuration allows to operate an evaporator without frequent stops and even avoiding using multiple presses for achieving the same operation time.

The waste accumulated in the hollow filter frame 12 can be cleaned without removing the 100 press by means of the self-cleaning water and air jet ports 25 in area 103 and all waste material going to the drain port DP.

The press 100 may have multiple syrup inputs 104, which have two functions: a) an input function of the syrup into the hollow filter plate 12; and b) a function of creating an air and/or water shower in area 103 using a plurality of jets during the cleaning phase of the hollow filter plates 12 when the press is clogged with filtration waste.

Figure 8:
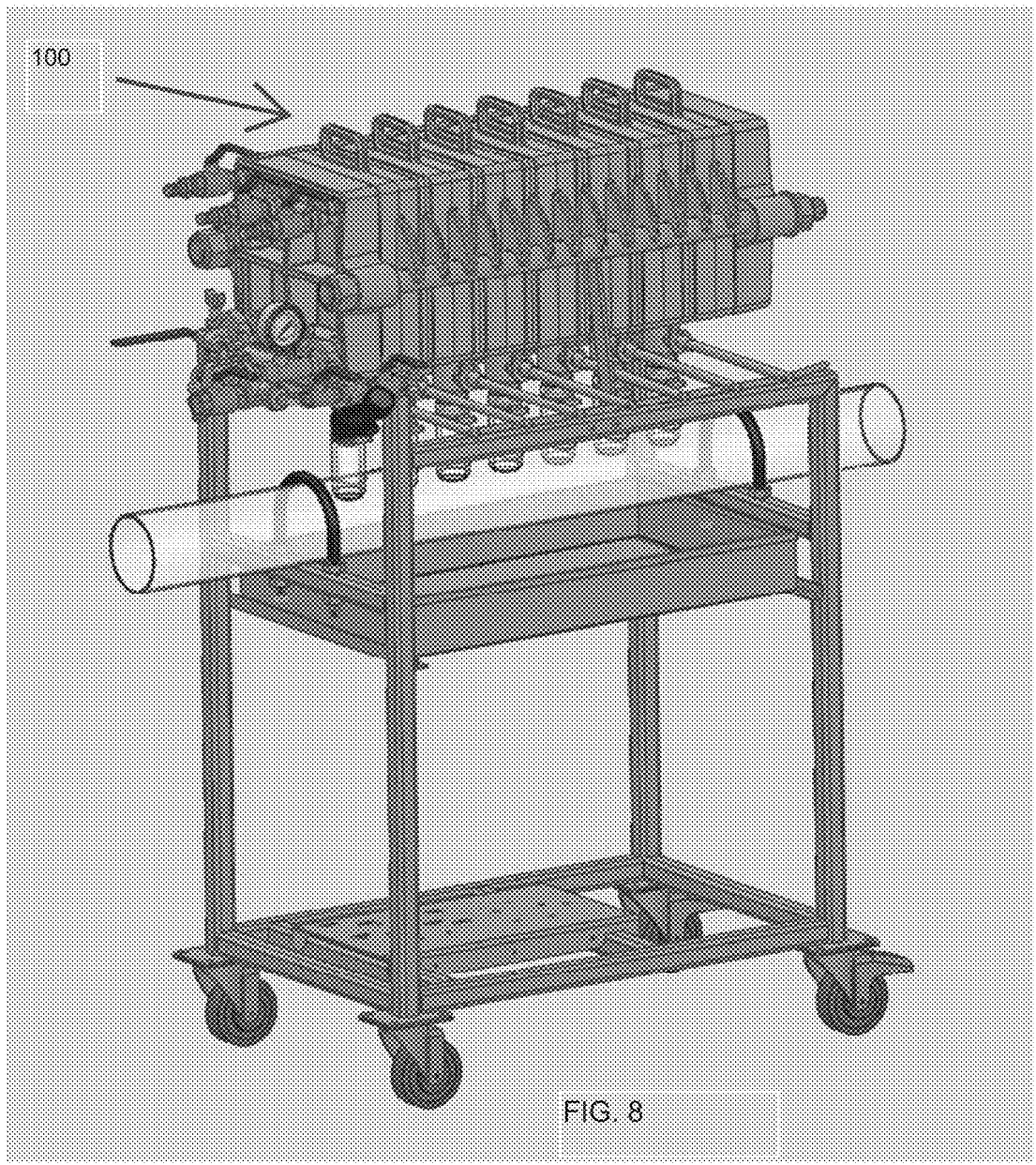
FIG. 8 is a perspective view of the self-cleaning press shown in FIG. 5 with valves being connected, according to a preferred embodiment of the present invention.
Figure 9:
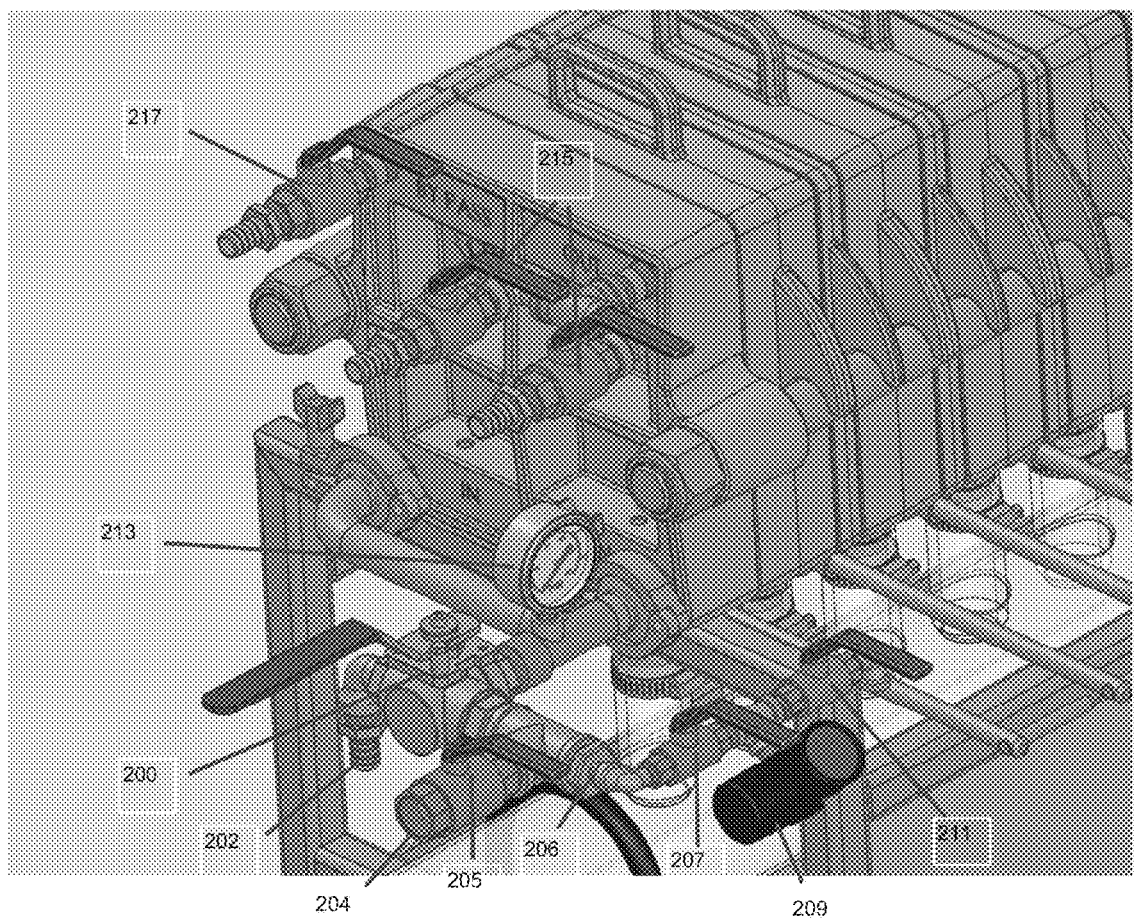
FIG. 9 is a detailed view of the front of the self-cleaning press shown in FIG. 8.

Referring to FIG. 9, there are shown different valve connections used in the filter press shown in FIG. 8. A three-way control valve 200 is used to select the input of syrup 202 or to select the input of hot water 204 and air 206 for cleaning the press. A water valve 205 controls the entry of hot water and an air valve 207 control the entry of air. An air regulator 209 is connected the air valve 207. The air regulator is connected to an air compressor (not shown). An optional output valve 211 may be connected to the air valve 207 for controlling a diaphragm air pump (not shown). A monometer 213 is connected to the three-way control valve 200 and between the two inlet ports. Two output valves 215 are connected to the outlet port of the press. The output valves 215 is for controlling the flow of filtered syrup towards a collection recipient (not shown) and towards a flow control box (not shown) or maple sap container (not shown). A bypass valve 217 is connected to the bypass outlet port. This bypass port is normally used during the warming up of the press or when starting the press. The bypass valve 217 is usually closed during both the filtering process and the cleaning process.

In order to clean the filter press, one has to open the drainage valve of the drainage device 107, by moving the lever 109; open at least one of the water valve 205 and the air valve 207; close the output valve 215. The air regulator 209 is to be set to a pressure that is less than a maximum pressure of 45 psi. Ideally the pressure is set between 40 psi and 45 psi to achieve proper cleaning.

Figure 10:
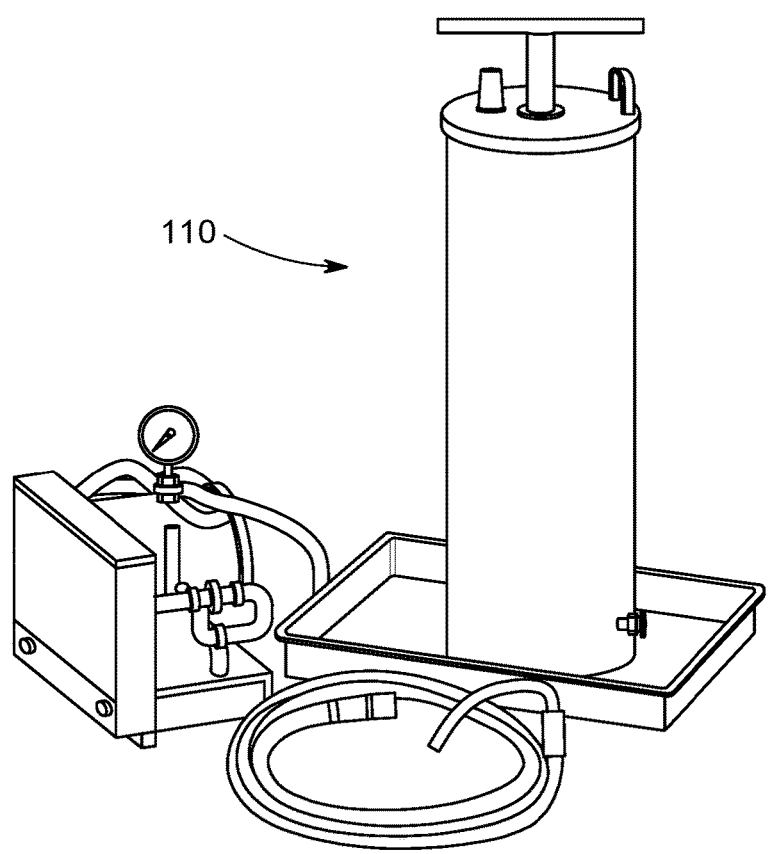
FIG. 10 is a perspective view of a cylinder press.

Referring to FIG. 10, there is shown a cylinder press which operates substantially the same manner as the standard press shown in FIG. 1. Those skilled in the art will understand that the invention described above may also be implemented in a circular press.

The press of the present invention is designed primarily for use in the maple syrup industry. It can, however, be used in many filtering applications, such as honey, beer or wine processing.

The scope of the claims should not be limited by the preferred embodiments set forth in the examples, but should be given the broadest interpretation consistent with the description as a whole.

The invention claimed is:

1. A plate for filter press, the plate comprising two inlets for syrup, an outlet for filtered syrup through a membrane filter, a waste accumulation area where waste material accumulates, and a drain, the plate comprising a plurality of channels connected to at least one of the two inlets for cleaning the membrane filter and the waste accumulation area by injecting a fluid including air and/or water in the waste accumulation area and evacuation through the drain.

2. A self-cleaning press system for filtering a fluid product, comprising:
   a hollow filter frame (12) defining an inner area (102) thereof where waste material accumulates during filtration of the fluid product, the hollow filter frame (12) comprising an inlet feed port (104) for receiving said fluid product and an outlet exit port (105) for expelling a filtrate; a solid filter plate (11) comprising an inlet feed port (24a') and an outlet exit port (24b') for respective alignment with the inlet feed port (104) and the outlet exit port (105) of the hollow filter frame (12), the solid filter plate (11) comprising at least one filtrate exit port (28) in an inner area thereof connected to the outlet exit port (24b') for draining the filtrate;
   a filter layer (13) for filtering the fluid product, said filter layer (13) being configured to be installed between the hollow filter frame (12) and the solid plate (11);
   wherein said hollow filter frame (12) comprises a plurality of jet ports (25) in an inner zone (103) thereof connected to the inlet feed port (104) for injecting a pressurized cleaning fluid onto the inner area (102) of the hollow frame (12) and for dislodging said waste material;
   wherein said hollow filter frame (12) comprises a drain port (DP) on said inner surface (A) thereof for draining said waste material being dislodged by said pressurized cleaning fluid being injected through the plurality of jet ports (25).

3. The press system of claim 2, wherein said pressurized cleaning fluid comprises water and/or air.

4. The press system of claim 2, wherein the drain port (DP) is operatively connected to a drainage device (107) comprising a drainage valve for evacuating said waste material through the drainage device (107), wherein said inlet feed port (104) is operatively connected to at least one of a water valve (205) and an air valve (207), and wherein said outlet exit port (105) is operatively connected to an output valve (215).

5. A method of cleaning the press system of claim 4, comprising:

opening said drainage valve of the drainage device (107);
      opening at least one of said water valve (205) and said air valve (207); closing said output valve (215).

6. The method of cleaning the press system of claim 5, comprising:

operatively connecting the air valve to an air compressor via an air regulator.

7. The method of cleaning the press system of claim 6, comprising:

setting said air regulator to a pressure that is less than a maximum pressure of 45 psi.

8. The method of cleaning the press system of claim 6, comprising:

setting said air regulator to a pressure of between 40 psi and 45 psi.

\* \* \* \* \*